June 7, 1960 — H. T. ROCKWELL — 2,939,752
LUBRICATOR

Filed May 24, 1956 — 5 Sheets-Sheet 1

INVENTOR:
HARLEY T. ROCKWELL,

BY C. C. Hines,

ATTORNEY

June 7, 1960     H. T. ROCKWELL     2,939,752
LUBRICATOR
Filed May 24, 1956     5 Sheets-Sheet 2
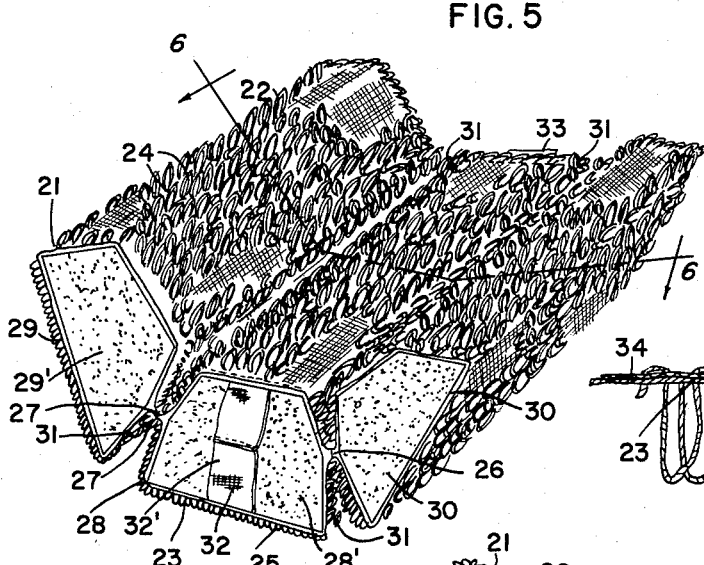
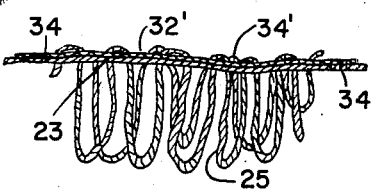
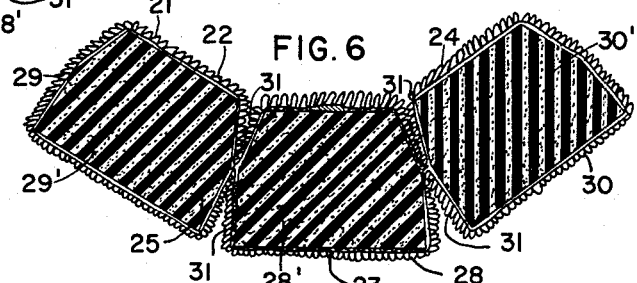
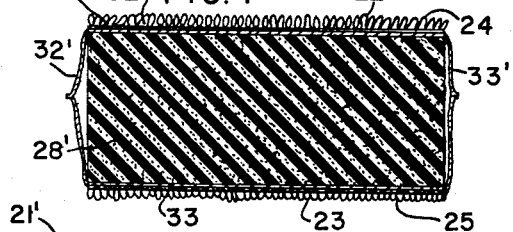
INVENTOR:
HARLEY T. ROCKWELL
By
ATTORNEY.

June 7, 1960  H. T. ROCKWELL  2,939,752
LUBRICATOR
Filed May 24, 1956  5 Sheets-Sheet 3
FIG. 9
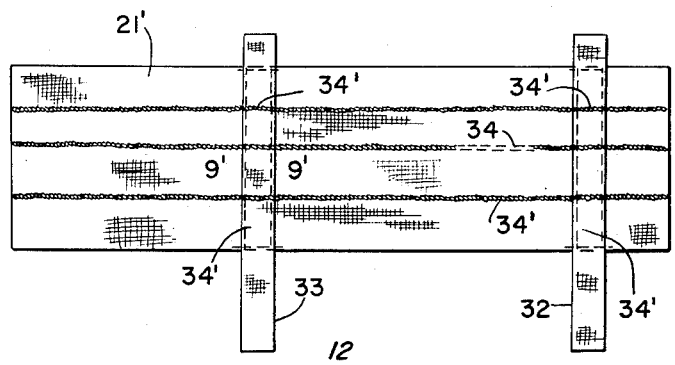
FIG. 10
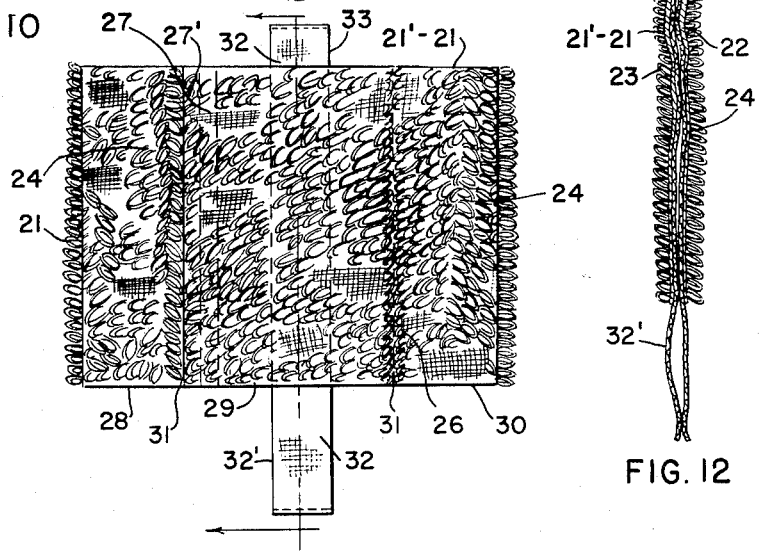
FIG. 12
FIG. 11
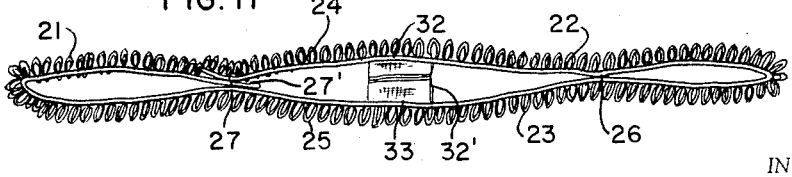
INVENTOR:
HARLEY T. ROCKWELL
BY
ATTORNEY.

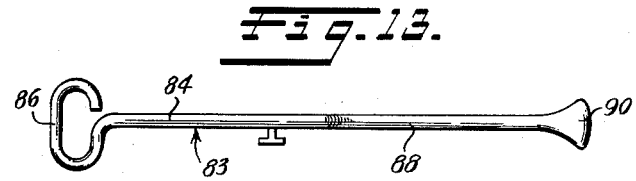
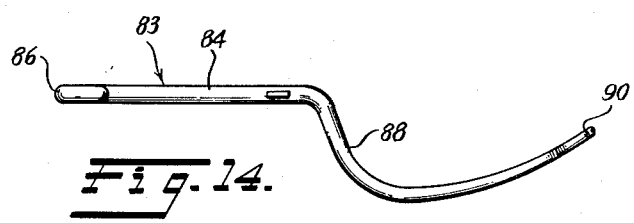
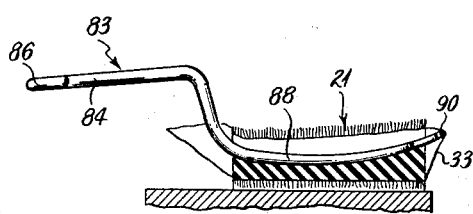
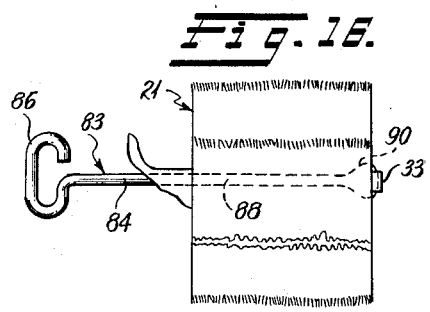
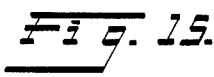
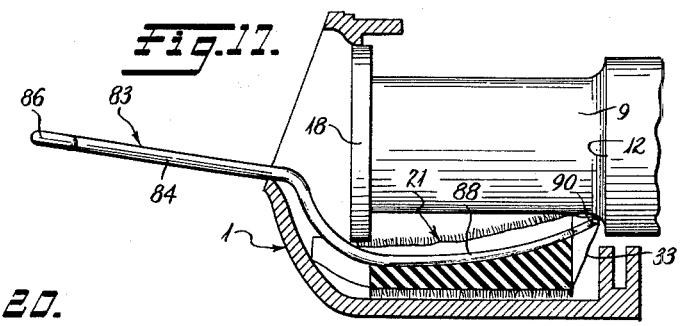
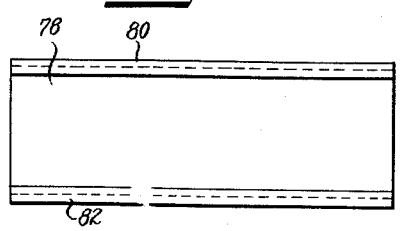

June 7, 1960     H. T. ROCKWELL     2,939,752
LUBRICATOR

Filed May 24, 1956     5 Sheets-Sheet 5

INVENTOR
Harley T. Rockwell
BY Diggins & LeBlanc
ATTORNEY

United States Patent Office 2,939,752
Patented June 7, 1960

2,939,752
LUBRICATOR

Harley T. Rockwell, Yonkers, N.Y.
(136 Chittenden Ave., Tuckahoe, N.Y.)

Filed May 24, 1956, Ser. No. 587,161

7 Claims. (Cl. 308—243)

This invention relates to lubricators for the axle journals of railway cars and the like and particularly relates to improvements in lubricators of the type shown in my prior applications Serial No. 483,641, filed January 24, 1955, now U.S. Patent No. 2,807,803, and Serial No. 544,257, filed November 1, 1955, now abandoned, of which this application is a continuation-in-part. The lubricators described in these applications comprise an applicator pad formed of lubricant holding bodies or core sections of absorbant or porous elastic or resilient material enclosed in a permeable fabric jacket or casing. During use the pad is located in the axle journal box beneath the journal and is formed to contact with the bottom and sides of the inner portion of the journal to convey a lubricant, such as oil, thereto in the rotation of the journal. These pads are used to take the place of the commonly used cotton waste for the purpose of securing better lubrication of the axle journals, particularly those operating under heavy loads or high train speeds, in order to prevent over heating of the journal and development of what is known as a hot box. While the pads disclosed in my aforementioned prior applications have been found highly efficient in furnishing lubrication to journal bearings operating under heavy loads or high speeds, certain disadvantages have been noted which the present invention has been devised to overcome.

Because it is necessary to provide the pads with resilient bodies or cores of sufficient thickness to resiliently bear against both the journal and the bottom of the journal box in order to supply adequate lubrication, difficulty has been experienced both in inserting and removing the pads through the contracted space between the doorway of the journal box and the stop collar at the outer end of the journal. While it is possible to insert a pad by simply compressing it by hand, difficulty has sometimes been experienced in insuring that the rear end of the pad is properly placed in the journal box. In the removing of the pad, it is difficult to grip the pad and to draw it through this contracted space and its resistance to removal is apt to be so great that the pad envelope fabric is objectionably strained or weakened and distorted out of proper shape.

It is accordingly a primary object of the present invention to provide a pad having a novel construction and arrangement of reenforced pull tabs or handle loops by means of which a pad may be readily inserted into the journal box and removed without objectionable strain upon or injury to the pad, and whereby a reversible pad arranged with either end facing forwardly may be employed and withdrawn without injury from the journal box.

It is another object of the invention to provide a simple tool for cooperating with such loops to insert a pad into proper position in the journal box.

It is another object of the invention to provide a pad of the foregoing character having novel means for retaining the resilient bodies or cores therein.

It is still another object of the invention to provide a novel method of fabricating a pad of this nature.

These and further objects and advantages of the invention will became apparent upon reference to the following specification and claims and appended drawings wherein:

Figure 5 is a perspective view of the pad removed from the journal box with the cores therein disposed in a position which it normally assumes in the journal box prior to being placed under pressure;

Figure 6 is a section through the pad taken on line 6—6 of Figure 5;

Figure 7 is a longitudinal section taken through the center pad pocket and the resilient core enclosed therein;

Figure 8 is a plan view of a part of a blank of a pad envelope showing a first operation of applying a pull tape thereto;

Figure 9 is a plan view of the envelope blank with tapes and pile applied ready for the folding of the blank to form the pad envelope;

Figure 9a is a sectional view through a part of the fabric envelope and tape showing the interlock between the envelope fabric, tape and pile loops;

Figure 10 is a view of the folded envelope with tapes applied and in readiness for the final step of stitching the tape ends to form the pull loops;

Figure 11 is a front elevation of the pad in collapsed condition;

Figure 12 is a section taken on the line 12—12 of Figure 10;

Figure 13 is a plan view of an applicator tool for inserting the pad;

Figure 14 is a side view of the applicator tool of Figure 13;

Figure 15 is a longitudinal vertical section showing the insertion of the applicator tool into the pad prior to inserting the pad in the journal box;

Figure 16 is a plan view of a pad with the applicator tool inserted;

Figure 17 is a longitudinal vertical section showing the insertion of the pad into the journal box with the aid of the tool;

Figure 20 is a plan view of the envelope blank with edge tapes applied according to another embodiment of the invention.

Figure 1:
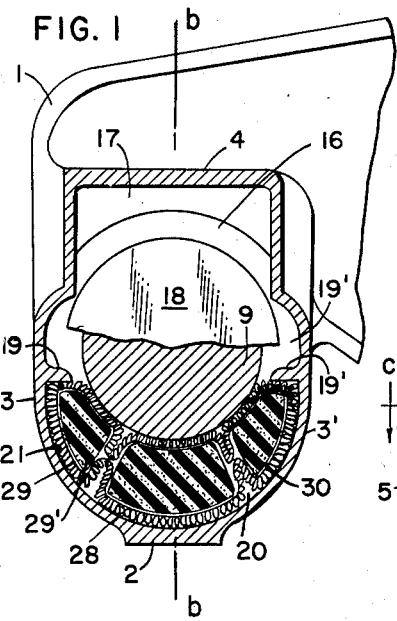
Figure 1 is a vertical transverse section of a journal box taken on line a—a of Figure 2 showing the lubricating pad of the invention arranged for use between the journal box and journal.
Figure 2:
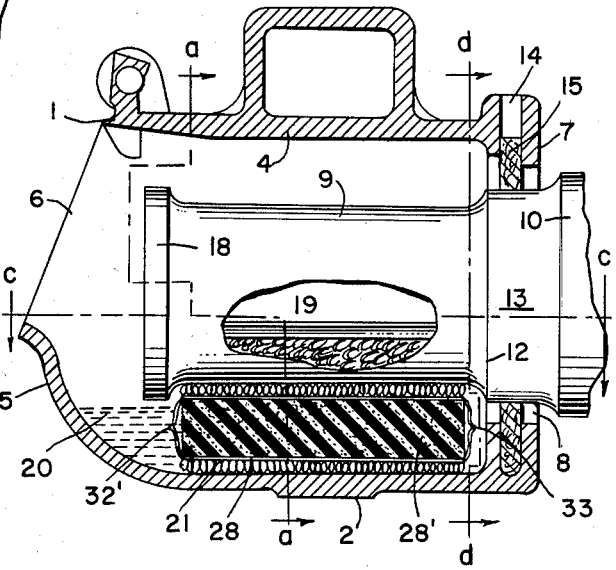
Figure 2 is a vertical longitudinal section taken on line b—b of Figure 1 showing the journal box, journal and pad, a portion of the journal being broken away to show one of the stop ribs or flanges.
Figure 3:
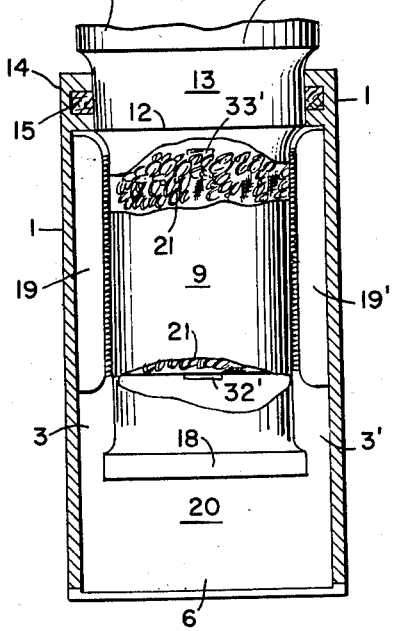
Figure 3 is a horizontal section taken on line c—c of Figure 2 through the journal box, journal and pad.
Figure 4:
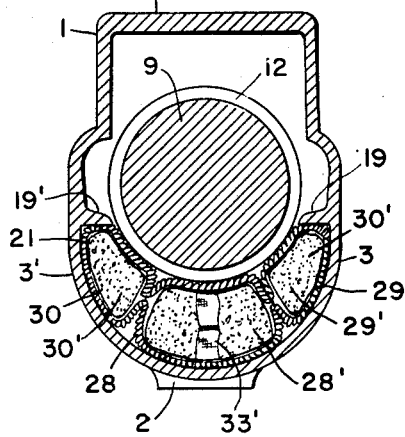
Figure 4 is a vertical transverse section taken on the line d—d of Figure 2 looking from the rear toward the front of the journal box.

Referring now more particularly to Figures 1 to 7, inclusive, of the drawings, 1 designates a journal box of a certain type in connection with which the lubricator pad may be used, which comprises in its construction a bottom wall 2, side walls 3, 3', a top wall 4, a front wall 5 provided with a doorway or door opening 6, and a rear wall 7 having an opening 8 for passage of the journal 9 of the wheel carrying axle 10, which is formed at its rear end with the shoulder 11 and abutment 12 lying at the rear and front of the sealing surface 13 located at the juncture of the outer end of the axle and inner end of the journal. The surface 13 is disposed to rotate in the opening 8 and the wall 7 is provided with the usual well 14 to receive a sealing disk or gasket 15 which encircles and contacts with the surface 13 to close the opening 8 against the entrance of dust and other foreign substances to the journal box and the escape from the box of any undue amount of lubricating oil. The upper portion of the box, i.e., that portion between the wall portions 3, 3' and the wall 4, is formed to provide a chamber to hold the journal hearing 16 and its retaining wedge 17, while the outer or forward end of the journal is formed or provided with the usual lubricant applicator retaining collar or flange 18 located in proximity to the door opening 8. This type of box has its wall portions 3, 3' extending upwardly from the wall 2 convergently or on tapering lines to points located on opposite sides of the lower portion of the journal, at which points the side walls of the box are provided with cast stop ribs or flanges 19, 19' to determine the working position of the lubricator pad. The box construction described provides at the base of the box below the journal a reservoir chamber for lubricating oil, as indicated at 20, and to receive the lubricator pad, which reservoir chamber is curved transversely of the box eccentrically with relation to the journal and is of greatest depth at its vertical center and thence tapers or converges toward the ribs or flanges 19, 19'. This box construction is shown merely as one of exemplicative type to which the pad may be applied, and it is to be understood that the use of the pad is not limited thereto, and that in practice the pad may be applied to any other type of box suitable for its reception.

The lubricator pad 21 is designed to fit in the reservoir chamber between the wall surfaces 2, 3, 3' and ribs 19, 19'. This pad is made of a piece of strong and durable, absorbent or permeable pile surfaced textile material of suitable length and width which is folded upon itself with its pile surfaces outermost, to form relatively upper and lower wall portions 22, 23 carrying pile surfaces 24, 25, which walls are stitched together at two intermediate points transversely of the walls by longitudinally extending seams, 26, 27, the ends 27' of the fabric being preferably lapped at the point where the walls of the fabric are joined by the seam 27 so that a single line of stitching may be used to unite both walls and the lapped ends 27' at this point. This simplifies the construction, but is not imperative, as the walls alone may be united by the seam 27 at this point and the lap arranged at a different point and secured by an additional seam. The construction described provides a pad casing or jacket having a central pocket 28 and side pockets 29, 30 which are open at each end and which when spread from a normally collapsed or slack condition are separated by intervening partition walls formed by V-shaped or valley-like infolded tucks or pleats 31 united by the seams 26, 27. These partition walls in the spread condition of the pockets are essentially double walls whose pile loops are overlapped and internested or commingled together as shown at 31' to form oil storage conductors of large storage capacity and adapted by capillary action to convey a large volume of oil to the surface of the journal. In this action the nested tucks or pleats in the valley-like infolds provide short capillary paths of high capacity for the upflow of oil from the reservoir 20 to the upper pile surface of the pad and surfaces of the journal to meet all normal demands and varying demands for feed of lubricant to the journal at medium-high and very high train speeds.

The pockets 28, 29 and 30 are designed to receive porous oil storage and feed core bodies or cartridges 28', 29', 30', of resilient material. These core bodies or cartridges are preferably made of cellular resilient material, such as natural or synthetic sponge rubber, and are coextensive in length with the pockets and of cross-sectional form and dimensions to snugly fit the pockets and hold the same spread and to be placed under pressure to compress the pad and keep it in a state of compression with its surfaces pressed against the surfaces of the walls 3, 3', the flanges 19, 19' and the surface of the journal. The pores or cells of these resilient core bodies or cartridges are initially charged with oil and they take up oil conveyed thereto by the fabric container and expel the oil through the applying surfaces of the container to keep the ply loops saturated for a consistent and complete lubricating action. In practice resilient cores of polygonal cross-section or other suitable form and of suitable degrees of resiliency are used. When these are arranged in position for use they extend parallel with the journal, elastically conform under pressure to the surfaces mentioned and increase the flow of oil being fed by capillary action to the journal by a pumping action induced by relative motion between the box and journal causing compression and expansion of the resilient cores. These various feed methods caused by the construction of the pad and working actions of the parts ensure efficient lubrication of the journal at all speeds and for long periods without liability of the journal becoming overheated. The pad construction described also provides a flexible compressible and expansible pad which can be charged with oil for initial use, applied for use in charged condition, removed when required for cleaning or repairs with or without the removal of the resilient cores from the pockets, which can be reversed to use either of its wall faces 24, 25 as applicators to feed oil to the journal, and which can also be reversed to change the working arrangement of the cores and their pockets from one side to the other side of the journal to make the wear and lubricating action uniform in either direction of rotation of the journal. In practice, the pad, before being put into use, is placed in a pan or other suitable receptacle containing oil and compressed and allowed to expand to take up oil until the pad is fully saturated and the cores charged with oil. The pad is then introduced into the box through the doorway and beneath the journal collar and forced under pressure into the reservoir chamber until it contacts with the ribs and journal and is held under compression between the walls of the chamber, ribs and bottom and sides of the journal, in which position it will perform its feed functions in the manner described.

The basic feature of the pad construction disclosed in U.S. Patent No. 2,807,803, with which the pad structure of the present application conforms, is the provision of a pad comprising three flexibly connected sections, namely, a center section and a side section at each side thereof, formed with pockets to receive resilient cores of the character described. These cores may be, as stated, of any suitable form in cross-section, when not under restraint, but are preferably so formed in practice that when encased in the pockets of the envelope or placed under compression in service they will assume a more or less oval form in cross-section and conform substantially to the curvature of the bottom of the jounral box and surface of the journal. The provision of a pad with three pockets permits of the use of a central core of major depth and resistance to compression and side cores of less depth and softer or of less resistance to compression. Thus when the pad is placed in position the center section will fill the eccentric space between the bottom of the journal box and bottom of the journal and contact under high pressure against the bottom of the journal, while the side sections will flex and assume a curved form concentric with and in contact with the journal and will be held under pressure against the sides of the journal. This ensures positive uniform lubrication of the surface of the journal at all times. This also ensures greater stability of the center section against shifting or getting out of alignment, as such section is resilient in a vertical plane passing through the journal axis and resistant to movement in a horizontal plane transversely of the box, so that there is no tendency of the pad to cramp or buckle against the ribs 19, 19' or any other surface which may be employed to aid in keeping the pad accurately centered. This is not possible with the use of a pad having two sections only and not specifically constructed to perform the above described functions of my three section pad.

In order to provide a means to facilitate removal of the pad from the box I provide the pad with draw or pull means by which it may be withdrawn and with reenforcing means to sustain the fabric under the strain of the pull to prevent the pad from being permanently distorted or torn under the pulling strains. As shown, the inner faces of the walls of the pad are provided, preferably along the center line of the center pocket 29, with reenforcing bands or tapes 32, 33 which are stitched to the walls, as shown at 34, and which extend across the pad from front to rear of the pad and beyond the front and rear edges of the wall and are stitched or otherwise united at their respective adjacent ends to form pull handle-loops or tabs 32', 33' large enough to be gripped by a crewman or engaged by a tool manipulated by him whereby the pad may be extracted with ease and facility. Loop 32' at the front of the pad is preferably made larger than loop 33' in order to allow it to be spread sufficiently to permit a core to be inserted into or removed from the center pocket. Loop 32' is made sufficiently large to allow it to spread when the pocket is filled with a core and to enable it to be engaged by hand or tool to effect removal of the pad when it is applied in reversed position or with its rear end facing the door, but the loop 33' may be made of the same size as the loop 32' if desired. The bands or tapes 32, 33, like the envelope fabric, are made of strong shrink-proof fabric, sufficiently strong to withstand all pulling strains to prevent distortion of the pad or undue stretching or tensing of the pad fabric under all pulling conditions. While two independent tapes are shown united at their ends to form the pull loops, it will be understood that the pull feature may be otherwise constructed so long as they are adapted to perform the functions described.

Whether the pad envelope is made of one, two or more pieces, I preferably employ a novel method of constructing it with special reference to the application of the pull bands or tapes and pile elements to produce in a simple manner a structure of great strength to withstand wear and tear and pulling strains. Figures 8 to 12, inclusive show the steps employed in forming the pad. Figure 8 shows the first step which consists in preparing a shrink-proof lubricator pad sheet 21' of selected fabric of the size adapted to be folded to form the envelope body. To the inner surface of the wall forming portions of this sheet in outspread condition are applied the tapes 32, 33 which extend across the sheet to and beyond its front and rear edges and are secured thereto by lines of stitching 34. The tapes are of proper length each to adapt them to be stitched or otherwise connected at their free ends to form the pull tabs or handle-loops on the partial folding of the blank to dispose the tape ends in superposed relation. Prior to the folding operation the pile fabric is applied, the loops of which not only pass through the body fabric but also through the tapes, as shown at 34'. The pile loops thus interlock and fasten the tapes to the fabric to increase the strength of the pad body and resistance of the body to distortion and of the fabric to stretching or tearing under pulling strains, as well as to reenforce and increase the strength and durability of the pile loops themselves. The pad is then folded upon itself to align the ends of the tapes and lap the ends of the fabric sheet which are united by the lines of stitching 26, 27, as shown in Figures 10 and 11, after which the pockets of the pad body are filled with the resilient cores to complete the pad for use. This method of producing a reenforced pad with pulling means is simple and comparatively inexpensive, and provides one way of connecting and mutally reenforcing the pad body, tapes and pile elements, but other suitable ways of uniting them may be employed.

Figure 18:
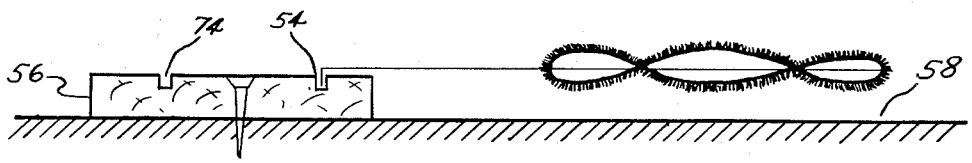
Figure 18 is a vertical section showing a guide block and jig for sewing the envelope.
Figure 19:
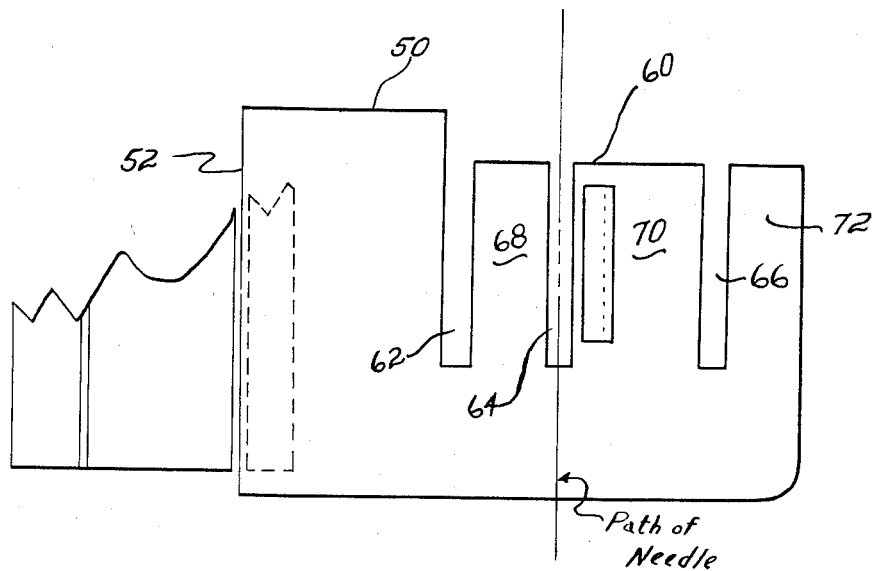
Figure 19 is a plan view of the jig and guide block.

In order to fold the pad fabric sheet and to stitch it into position accurately in a minimum amount of time I provide the jig and guide apparatus shown in Figures 18 and 19. Referring to these figures there is shown a jig 50 which comrpises a thin sheet of material such as metal, plastic or cardboard. One end of the sheet of the jig 50 is folded down as shown at 52 and this end slides in a groove 54 in a guide block 56 attached to the sewing machine table 58. The jig 50 is offset at 60 and is provided with three transverse slots 62, 64 and 66. The depth of the slots 62, 64 and 66 is adequate to take care of the width of the pad blank and the slots 64 and 66 are placed so as to be located at the desired positions for the lines of stitching 26 and 27. The width of the fingers 68, 70 and 72 between the slots is of a dimension to form proper sized pockets in the pad blank wrapped therearound. In utilizing this jig the pad blank is wrapped therearound by securing one end over the slot 64, wrapping the fabric over finger 68, through slot 62 around the bottom of the jig beneath all of the fingers, and then folding it around finger 72 to lay across the top of the jig so that the other end of the blank also overlaps slot 64. The down turned end 52 of the jig is then placed in groove 54 of the guide block 56 and the jig pushed therealong so as to pass the slot 64 and the pad blank mounted thereover beneath the needle of the sewing machine. The jig is then removed from groove 54 and its down turned end placed in a second groove 74 so that the other line of stitching may be placed in slot 66. The pad may then be removed from the jig in a completed condition with all of the pockets therein formed accurately and quickly with a minimum expenditure of labor. It will be noted that the distance between grooves 54 and 74 is equal to the distance between slots 64 and 66, and that the distance between the down turned edge 52 and slots 64 and 66 is equal to the distance between the needle and grooves 54 and 74 respectively.

While I have found that the knobby interior surface of the tufted material largely prevents movement of the resilient core material within the pad there are certain instances wherein it is desirable to provide additional movement preventing means. I have found that this may be satisfactorily accomplished in a simple and inexpensive manner if the pad blank 78, as shown in Figure 20, is provided with over edging tapes 80 and 82. These tapes are preferably sewn onto the edges of the pad before the tufting operation and are placed under sufficient tension during the sewing to cause a puckering of the mouth ends of the pockets after the pad is completed. This tensioned tape then tends to close around the ends of the resilient cores to a certain extent to retain them in position and to prevent movement with respect to the envelope.

In placing the pads in a journal box I have found that they may be positioned in a much more satisfactory manner than is possible with hand insertion if a novel tool which I have devised is used for this purpose. Referring to Figures 13 through 17 there is seen a tool 83 which is rod or wire like in nature and which consists of a handle 84, loop 86 and arcuate tine 88. The end of the tine 88 is flat and blunted as shown at 90 and lies below an extension of the axis of the handle 84. In utilizing this tool the pad to be inserted in a journal box is placed upon a table or other support and the tine 88 of the applicator tool is forced between the pad fabric and the resilient core in the center envelope until the blunt nose 90 of the tool engages the loop 33 at the rear of the pad. The pad is then inserted in the door of the journal box and may be forced rearwardly into position by means of the applicator tool as is best seen in Figure 17. It will be noted that the particular arcuate shape of the tine 88 not only permits the tine to be inserted fully in the journal box until the rear loop engages the journal fillet, but it also compresses the resilient core so that it easily passes under the journal end collar. The applicator tool may then be removed and the pad is properly positioned in the journal box.

It will be apparent from the foregoing that I have provided a lubricating pad and method of assembling and inserting the same which are fully capable of satisfying the objects of my invention. With the particular articulated construction of my lubricating pad the fabric which is sandwiched between the resilient compression cores performs the following functions. It forms a hinged connection between the sections to facilitate proper conformance to the crescent shaped space between the journal and the bottom of the journal box, it provides a pad design which can be reversed to allow two periods of service with new tufted surface in contact with the journal during each period, it provides a design which can be constructed with a multiplicity of resilient cores which are arranged parallel to the journal with fabric around and between each to assure conformance with the shape of the journal and journal box, and it provides a design with a multiplicity of resilient cores with fabric around each to absorb oil and to feed the lubricant to the journal by capillary action, the oil flowing by the shortest possible paths from the bottom of the journal box to the journal through the fabric between and around the resilient cores. The pads of my invention are susceptible of simple and economic manufacture and through the use of a novel applicator tool may be inserted in the journal box in proper position with a minimum of effort. A removal means is provided on the pad so that removal may also be accomplished without damage to the pad surface which would prevent its reuse.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A journal lubricator comprising a flexible pad adapted to be disposed in the bottom of a journal box beneath the bottom and sides of the journal and to be inserted and withdrawn through the door of the journal box, said pad consisting of an envelope body formed from a strip of absorbent textile fabric having lapped ends, said ends and the walls of the envelope body being stitched together to form central and side parallel pockets having a looped outer pile surface to apply lubricant to the journal, lubricant holding bodies of porous resilient material disposed in the pockets, and reenforcing strips of textile material extending parallel with the pockets along the inner faces of the walls of the body between its front and rear marginal edges and secured by the pile loops to the envelope body, the ends of said strip at one of said marginal edges being fashioned to form a pull loop whereby the pad is adapted to be gripped and withdrawn through the door opening of the journal box, said strips cooperating with the pile loops to strengthen the fabric walls against injury under pulling strains.

2. A lubricating pad of the character described comprising a textile fabric body having upper and lower walls, flexibly connected pockets between the walls, pull tapes extending across the relatively inner faces of the walls between their front and rear edges, pull devices connected with the tapes adjacent the front and rear edges of the body, and looped pile elements covering the relatively outer faces of the fabric body walls with their loops threaded through the walls and threaded through the pull tapes at their points of connection.

3. A lubricating pad of the character described comprising a textile fabric body having upper and lower walls, flexibly connected pockets between the walls, pull tapes extending across the relatively inner faces of the walls between their front and rear end edges, pull devices connected with the tapes adjacent the front and rear edges of the body, and looped pile elements covering the relatively outer faces of the fabric body walls with their loops threaded through the walls and pull tapes.

4. A journal lubricator comprising a flexible pad formed of absorbent textile material provided with flexibly connected longitudinal parallel pockets extending between its front and rear marginal edges and having a napped outer surface to supply lubricant to the journal, lubricant holding bodies of porous resilient material disposed in the pockets, tapes on the front and rear marginal edges of said pad forming openings of smaller peripheries than said pockets, and pull projections extending beyond said marginal edges to facilitate removal of said lubricator from a journal box in which it has been inserted.

5. A journal lubricator comprising an envelope body formed from a strip of absorbent textile fabric having lapped ends, the ends of the walls of the envelope body being stitched together to form parallel pockets, the envelope body having an outer surface of looped pile, lubricant holding bodies of porous resilient material disposed in the pockets, and a strip of sewable material extending parallel with the longitudinal axis of one of the pockets along the inner face of opposite walls of one of the pockets, the strip being secured by the pile loops to the envelope body, the part of the strip at one of the marginal edges of the pocket being fashioned to form a pull loop whereby the pad is adapted to be gripped and withdrawn through the door opening of the journal box.

6. A journal lubricator according to claim 5 wherein the pull loop extends beyond one of the marginal edges.

7. A journal lubricator according to claim 5 wherein the strip is of flexible textile material.

References Cited in the file of this patent

UNITED STATES PATENTS

| | | |
|---|---|---|
| 91,000 | Devlan | June 8, 1869 |
| 258,045 | Flynt | May 16, 1882 |
| 969,838 | Brown | Sept. 13, 1910 |
| 1,278,296 | Blood | Sept. 10, 1918 |
| 1,844,411 | Shutzer | Feb. 9, 1932 |
| 2,121,986 | Rohland | June 28, 1938 |
| 2,314,202 | Ewer et al. | Mar. 16, 1943 |
| 2,486,666 | Maudlin | Nov. 1, 1949 |
| 2,568,854 | Greeley | Sept. 25, 1951 |
| 2,639,498 | Rookstool | May 26, 1953 |
| 2,713,524 | Hagy | July 19, 1955 |
| 2,747,952 | Harkenrider | May 29, 1956 |
| 2,762,665 | Harkenrider | Sept. 11, 1956 |
| 2,762,667 | Harkenrider | Sept. 11, 1956 |
| 2,820,679 | Hoyer et al. | Jan. 21, 1958 |

FOREIGN PATENTS

| | | |
|---|---|---|
| 206,924 | Germany | May 3, 1908 |

UNITED STATES PATENT OFFICE

CERTIFICATE OF CORRECTION

Patent No. 2,939,752                                  June 7, 1960

Harley T. Rockwell

It is hereby certified that error appears in the printed specification of the above numbered patent requiring correction and that the said Letters Patent should read as corrected below.

Column 2, line 6, for "became" read -- become --; column 8, line 31, for "of", first occurrence, read -- and --.

Signed and sealed this 1st day of November 1960.

(SEAL)
Attest:

KARL H. AXLINE
Attesting Officer

ROBERT C. WATSON
Commissioner of Patents